(No Model.)

J. C. JACOBY.
GRAIN DRIER.

No. 286,203. Patented Oct. 9, 1883.

Witnesses
A. R. Brown
N. L. Williams

Inventor
J. C. Jacoby

UNITED STATES PATENT OFFICE.

JOHN C. JACOBY, OF POLK, OHIO.

GRAIN-DRIER.

SPECIFICATION forming part of Letters Patent No. 286,203, dated October 9, 1883.

Application filed March 8, 1883. (No model.)

*To all whom it may concern:*

Be it known that I, JOHN C. JACOBY, a citizen of the United States, residing at Polk, in the county of Ashland and State of Ohio, have invented certain new and useful Improvements in Grain-Driers; and I do hereby declare the following to be a full, clear, and exact description of the invention, such as will enable others skilled in the art to which it appertains to make and use the same.

This invention relates to improvements in grain and fruit driers, comprising a chamber or receptacle to contain the fruit or grain, which may be in bulk; or, in the case of Indian corn, the ears may be put in whole or the corn may be dried on the ear before cut from the stalk as well as after; and the invention consists of a box, chamber, or building with inside lining of basket, crate, frame, or slats nailed in permanently, or so as to be removed, said basket, crate, frame, or slats forming an air-chamber between the outside of the frame, &c., and the wall of the drier for free circulation of the heat supplied by hot-air or steam pipes.

Figure 1:
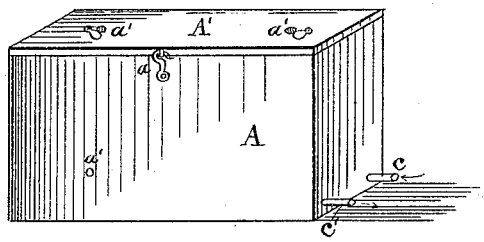
Figure 2:
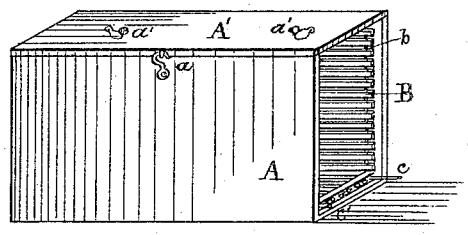
Figure 3:
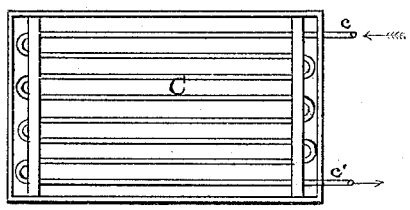
Figure 4:
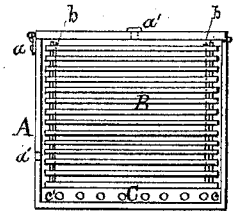
Figure 5:
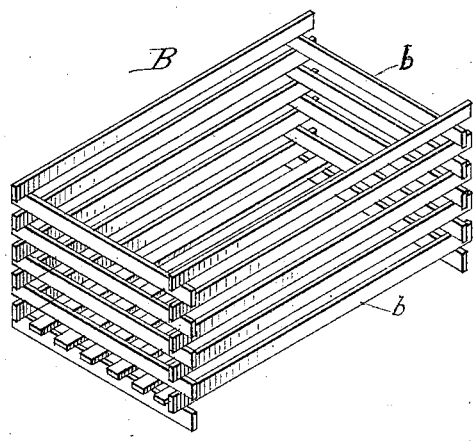

In the drawings, Figure 1 is a perspective view of a drier embodying my invention. Fig. 2 is a drier with one end removed to show the inside frame or basket of slats, &c., to hold the corn. Fig. 3 is a plan view of the bottom of the drier, showing the coil of pipe. Fig. 4 is an end elevation, having the board or end removed to exhibit the end of the crate, &c. Fig. 5 is a perspective view of the crate.

A represents a box or chamber, of any convenient size and proportions, having a lid or cover, A', hinged to it or otherwise arranged for removal and replacement, and provided with a latch, $a$, or knob to hold the lid down close. On the top and sides are ventilators $a'$ $a'$, for outlets of hot air or steam when the drier becomes too warm.

B represents the crate, basket, or slats, made to fit the box or chamber or building A, so as to leave an air-space between the same and the sides of the box or walls, as the case may be. This basket, crate, or slat-work may be made in any manner suitable for the material to be dried, as it is designed for drying grain, and especially Indian corn, either in the grain, on the ear, or before cut from the stalk, or to dry green corn for table use; also, for any kind of dried fruit for preservation.

C is the coil of pipes for steam or heated air, which pass through the drier in any form to suit and through any part of the drier. The proper ventilation or regulation of the heat is provided for in the valves at $a'$ $a'$ on the top and sides, as may be required.

The crate B is preferably made of slats $b$ $b$, laid alternately upon one another, as shown in Figs. 4 and 5, the corners being notched, if desired, to facilitate connection, and being fastened by wires woven in and around the ends of the slats; or a screw-rod may be run through the slats at each corner and provided with nuts at each end to secure the slats together. The crates are thus made in such a manner that the grain will be securely kept within the same, and are yet sufficiently open to permit a free circulation of heated air through them. The coil C is provided with an inlet, $c$, and an outlet, $c'$, and may be arranged as shown, or in any convenient manner, for the purpose of passing heated air or steam through the drying-chamber.

This apparatus can be readily made on any farm by any workman, and requires no special skill in its management. The grain is placed in the crate or basket B, which is then put into the box or chamber A, and the latter having been closed, heat in the form of steam or hot air is introduced through the coil C, the valves $a'$ $a'$ being manipulated to regulate the heat as required. New corn can be thus dried ready for the mill in a few hours, and with the effect of retaining its natural sweetness. When the apparatus is used for drying old corn, the crate is filled and its contents drenched with water, after which the inclosing box or chamber is closed and heat applied through the coil. The steam rising from the corn freshens and cleanses it, making it nearly or quite as good as new corn. The apparatus is also applicable for use in drying various grains and fruits.

Having thus described my invention, what I claim as new, and desire to secure by Letters Patent, is—

A grain-drier consisting of the box or chamber A, having a lid or cover, A', provided with fastening $a$ and ventilators $a'$ $a'$, a crate, B, arranged in said chamber, and composed of slats $b$ $b$, laid alternately upon one another, and a steam or hot-air coil, C, placed in the bottom of the box beneath the crate, as and for the purpose set forth.

In testimony whereof I affix my signature in presence of two witnesses.

JOHN C. JACOBY.

Witnesses:
 HENRY WICKS,
 W. H. AMBROSE.